(12) United States Patent
Han et al.

(10) Patent No.: US 11,729,268 B2
(45) Date of Patent: Aug. 15, 2023

(54) COMPUTER-IMPLEMENTED METHOD, SYSTEM, AND STORAGE MEDIUM FOR PREFETCHING IN A DISTRIBUTED GRAPH ARCHITECTURE

(71) Applicant: Alibaba (China) Co., Ltd., Zhejiang Provence (CN)

(72) Inventors: Wei Han, Beijing (CN); Shuangcheng Li, Sunnyvale, CA (US); Hongzhong Zheng, Los Gatos, CA (US); Yawen Zhang, Beijing (CN); Heng Liu, Beijing (CN); Dimin Niu, Sunnyvale, CA (US)

(73) Assignee: Alibaba (China) Co., Ltd., Hangzhou (CN)

( * ) Notice: Subject to any disclaimer, the term of this patent is extended or adjusted under 35 U.S.C. 154(b) by 0 days.

(21) Appl. No.: 17/835,911

(22) Filed: Jun. 8, 2022

(65) Prior Publication Data
US 2022/0417324 A1    Dec. 29, 2022

(30) Foreign Application Priority Data

Jun. 24, 2021   (CN) .......................... 202110701976.1

(51) Int. Cl.
*H04L 67/1097* (2022.01)
*G06F 16/901* (2019.01)

(52) U.S. Cl.
CPC ...... *H04L 67/1097* (2013.01); *G06F 16/9024* (2019.01)

(58) Field of Classification Search
CPC ......................... H04L 67/1097; G06F 16/9024
See application file for complete search history.

(56) References Cited

U.S. PATENT DOCUMENTS

| | | | |
|---|---|---|---|
| 10,387,453 B1 * | 8/2019 | Norton | G06F 16/2291 |
| 10,521,435 B2 * | 12/2019 | Balmin | G06F 16/285 |
| 11,108,873 B1 * | 8/2021 | Ezra | H04L 45/302 |
| 2016/0125093 A1 * | 5/2016 | Cho | H04L 65/403 |
| | | | 707/798 |
| 2017/0154445 A1 * | 6/2017 | Maruhashi | G06T 11/206 |
| 2019/0205480 A1 * | 7/2019 | Zhang | G06F 16/9024 |

(Continued)

FOREIGN PATENT DOCUMENTS

CN    114756483 A  *  7/2022

*Primary Examiner* — Shean Tokuta

(57) ABSTRACT

Various embodiments of the present disclosure relate to a computer-implemented method, a system, and a storage medium, where a graph stored in a computing system is logically divided into subgraphs, the subgraphs are stored on different interconnected (or coupled) devices in the computing system, and nodes of the subgraphs include hub nodes connected to adjacent subgraphs. Each device stores attributes and node structure information of the hub nodes of the subgraphs into other devices, and software or hardware prefetch engine on the device prefetches attributes and node structure information associated with a sampled node. A prefetcher on a device interfacing with the interconnected (or coupled) devices may further prefetch attributes and node structure information of nodes of the subgraphs on other devices. A traffic monitor is provided on an interface device to monitor traffic. When the traffic is small, the interface device prefetches node attributes and node structure information.

20 Claims, 7 Drawing Sheets

(56) References Cited

U.S. PATENT DOCUMENTS

| | | | | |
|---|---|---|---|---|
| 2020/0192368 A1* | 6/2020 | Bonanni | ............ | G01C 21/3844 |
| 2020/0202246 A1* | 6/2020 | Lin | ............................ | G06F 9/48 |
| 2020/0293712 A1* | 9/2020 | Potts | ........................ | G16H 10/60 |
| 2021/0243208 A1* | 8/2021 | Rubin | .................... | G06F 21/552 |
| 2022/0067011 A1* | 3/2022 | Yue | ..................... | G06F 16/2255 |
| 2022/0129766 A1* | 4/2022 | Potts | ........................ | G16H 70/20 |
| 2022/0180217 A1* | 6/2022 | Chan | ..................... | G06F 11/079 |
| 2022/0417324 A1* | 12/2022 | Han | .................... | H04L 67/1097 |

* cited by examiner

COMPUTER-IMPLEMENTED METHOD, SYSTEM, AND STORAGE MEDIUM FOR PREFETCHING IN A DISTRIBUTED GRAPH ARCHITECTURE

CROSS-REFERENCE TO RELATED APPLICATION

This patent application claims priority to China Patent Application No. 202110701976.1 filed Jun. 24, 2021 by Wei HAN et al., which is hereby incorporated by reference in its entirety.

TECHNICAL FIELD

The present disclosure relates to the field of computers, and specifically, to a computer-implemented method, a system, and a non-transitory computer-readable storage medium.

BACKGROUND

A graph (graph) is a type of data structure or database that is stored and executed by a computing system and used to model a set of objects and connections (relationships) between the objects in the set. The objects are represented as nodes (or vertices) in the graph connected or linked through edges. A characteristic or attribute of an object is associated with a node used to represent the object.

A graph can be used to identify dependency, cluster, similarity, match, category, flow, cost, centrality, and the like in a large dataset. Graphs are used in various types of applications. The various types of applications widely include but are not limited to graph analysis and graph neural networks (Graph Neural Networks, GNN for short), and more specifically, include applications such as an online shopping engine, social networking, a recommendation engine, a mapping engine (mapping engine), failure analysis, network management, and a search engine. Unlike in applications for facial recognition, where the sampled nodes (pixels) close to each other may be grouped, in the foregoing types of applications, the sampled nodes may be separated from each other by a plurality of hops (hop) (that is, two sampled nodes are spaced apart by a plurality of other nodes), and access may be performed randomly or irregularly.

Graphs allow for faster retrieval and navigation of complex hierarchies that are difficult to model in relational systems. A large number of processing operations associated with graphs include a graph traversal operation, such as pointer chasing which reads a node to determine one or more edges, where the identified edge or edges point to and are connected to one or more other nodes, the one or more other nodes may in turn be read to determine corresponding other edges, and so on.

Graph data generally includes node structure information and attributes. The node structure information may include, for example, information for identifying a node (for example, a node identity, or a node identifier, which may be simply referred to as a node ID) and information for identifying a neighbor node of the node. The attributes may include features or properties of an object and values of these features or properties. The object is represented by the node, and the features or properties of the object are associated with the node used to represent the object. For example, if the object represents a person, its features may include the person's age and gender, and in this case, the attributes also include a value to characterize age and a value to characterize gender.

A size of a graph is on the order of terabytes (terabytes). A graph may contain billions of nodes and trillions of edges. Therefore, a graph can be divided into a plurality of subgraphs, and the plurality of subgraphs can be distributed on a plurality of devices, that is, a large graph can be divided into a plurality of smaller subgraphs stored in different devices.

A node sampling phase is one of main causes of graph-related delays. Each node and edge have an associated performance cost, and therefore, accessing data in a large graph may result in very high overall communication cost (for example, latency caused and bandwidth consumed). Because information transmission between devices increases a delay, a delay in a distributed graph also increases accordingly.

It would be beneficial to reduce a delay associated with a large graph (especially a distributed graph).

SUMMARY

Embodiments of the present disclosure provide a solution to resolve the foregoing problem. In general, the embodiments of the present disclosure describe methods and systems for prefetching in a distributed graph architecture.

More specifically, in some embodiments of the present disclosure, a graph stored in a computing system is logically divided into a plurality of subgraphs, where the plurality of subgraphs are stored on a plurality of different interconnected (or coupled) devices in the computing system, and nodes of the subgraphs include hub nodes (hub node) connected to adjacent subgraphs.

In some embodiments of the present disclosure, each interconnected (or coupled) device stores attributes and node identifiers (identifier, ID for short) of the hub nodes of the plurality of subgraphs on other interconnected (or coupled) devices. In addition, a software or hardware prefetch engine on the device prefetches attributes and a node identifier associated with a sampled node.

Further, in some embodiments of the present disclosure, a prefetcher of a device connected (or coupled) to the interconnected (or coupled) devices can prefetch attributes, node identifiers and other node structure information of nodes of a subgraph on any interconnected (or coupled) device to another interconnected (or coupled) device that requires or may require the node attributes and node structure information. In some embodiments of the present disclosure, a traffic monitor is provided on an interface device to monitor traffic, and when the traffic is small, the interface device prefetches node attributes.

According to a first embodiment of the present disclosure, a computer-implemented method is provided, including: accessing a plurality of hub nodes in a graph, where the graph includes a plurality of nodes and is logically divided into a plurality of subgraphs, the subgraph includes at least one of the hub nodes, and each of the hub nodes in the subgraph separately connects the subgraph to another subgraph in the plurality of subgraphs; storing attributes and node structure information associated with hub nodes of a first subgraph in the plurality of subgraphs in a second device, where the second device is further configured to store information of a second subgraph in the plurality of subgraphs; and storing attributes and node structure information associated with hub nodes of the second subgraph in a first device, where the first device is further configured to store information of the first subgraph.

In some embodiments, the attributes and node structure information associated with the hub nodes of the first subgraph and the attributes and node structure information associated with the hub nodes of the second subgraph include one or more of the following attributes and node structure information: a corresponding attribute value, a corresponding node identifier, and a corresponding node structure.

In some embodiments, the method further includes: prefetching the attributes and node structure information associated with a hub node of the first subgraph into a prefetch buffer of the first device when a gap between the hub node of the first subgraph and a root node of the first subgraph is a single hop.

In some embodiments, the method further includes: prefetching the attributes and node structure information associated with a hub node of the second subgraph into a prefetch buffer of the first device when a hub node of the first subgraph is sampled, a gap between the hub node of the first subgraph and a root node of the first subgraph is a single hop, and a gap between the hub node of the first subgraph and the hub node of the second subgraph is a single hop.

In some embodiments, the method further includes: acquiring node identifiers of a plurality of nodes adjacent to a root node that is adjacent to a first hub node, sampling at least one subset of the nodes corresponding to these node identifiers, and prefetching attributes of the nodes in the sampled subset into a prefetch buffer of the first device.

In some embodiments, the method further includes: prefetching attributes and node structure information associated with one of the plurality of nodes into a buffer of a third device, where the third device is coupled to the first device and the second device.

In some embodiments, the method further includes: using the third device to monitor traffic, where when a measured value of the traffic meets a threshold, the prefetching is performed.

In some embodiments, in response to a request from the first device, the prefetching includes: acquiring node identifiers of a plurality of nodes adjacent to a second hub node on the second device; sampling at least one subset of the nodes corresponding to these node identifiers; and extracting attributes of the nodes in the subset into the buffer of the third device.

According to a second embodiment of the present disclosure, a system is provided, including: a processor; a storage unit connected (or coupled) to the processor; and a plurality of interconnected (or coupled) devices connected (or coupled) to the storage unit, where the plurality of interconnected (or coupled) devices include a first device and a second device, the first device includes a memory and at least one buffer, and the second device includes a memory and at least one buffer; where the first device is configured to store information of nodes of a first subgraph of a graph, the second device is configured to store information of nodes of a second subgraph of the graph, and the graph includes a plurality of subgraphs; the nodes of the first subgraph include a first hub node, the nodes of the second subgraph include a second hub node, and the first hub node and the second hub node are connected to each other through an edge; and the first device stores attributes and node structure information associated with the second hub node, and the second device stores attributes and node structure information associated with the first hub node.

In some embodiments, the first device includes an access engine, and the access engine is configured to: prefetch node identifiers of a plurality of nodes adjacent to a root node that is adjacent to the first hub node, sample at least one subset of the nodes corresponding to the node identifiers, and acquire attributes of the nodes in the subset.

In some embodiments, the attributes and node structure information associated with the first hub node and the attributes and node structure information associated with the second hub node include one or more of the following attributes and node structure information: a corresponding attribute value, a corresponding node identifier, and a corresponding node structure.

In some embodiments, when a gap between the first hub node and a root node of the first subgraph is a single hop, the attributes and node structure information associated with the first hub node are prefetched into a prefetch buffer of the first device.

In some embodiments, when the first hub node is separated from a root node and sampled, and a gap between the first hub node and the second hub node is a single hop, the attributes and node structure information associated with the second hub node are prefetched into a prefetch buffer of the first device.

In some embodiments, the system further includes: a third device connected (or coupled) to the first device and the second device, where the third device includes a prefetch buffer, and the third device prefetches attributes and node structure information associated with one of the plurality of nodes into a prefetch buffer.

In some embodiments, the third device further includes a traffic monitor, and when traffic measured by the traffic monitor meets a threshold, the third device prefetches the attributes and node structure information associated with the node into the prefetch buffer.

In some embodiments, the third device is configured to: in response to a request from the first device, acquire node identifiers of a plurality of nodes adjacent to the second hub node on the second device, sample at least one subset of the nodes corresponding to the node identifiers, and extract attributes of the nodes in the subset into the prefetch buffer of the third device.

In some embodiments, the first device includes a field programmable logic gate array, the second device includes a field programmable logic gate array, and the third device includes a memory-over-fabric connected (or coupled) to the first device and the second device.

According to a third embodiment of the present disclosure, a non-transitory computer-readable storage medium is further provided, including computer-executable instructions stored thereon, where the computer-executable instructions include: a first instruction, used to access a graph, where the graph includes a plurality of subgraphs, the plurality of subgraphs include a first subgraph and a second subgraph, the first subgraph includes a first node set having a first hub node, and the second subgraph includes a second node set having a second hub node, and the first subgraph and the second subgraph are connected through an edge connecting the first hub node and the second hub node; a second instruction, used to store attributes and node structure information associated with the second hub node in a first device, where the first device further stores information associated with the first subgraph; and a third instruction, used to store attributes and node structure information associated with the first hub node in a second device, where the second device further stores information associated with the second subgraph.

In some embodiments, the non-transitory computer-readable storage medium further includes: a fourth instruction, used to prefetch the attributes and node structure information associated with the first hub node into a prefetch buffer of the first device when a gap between the first hub node and a root node of the first subgraph is a single hop.

In some embodiments, the non-transitory computer-readable storage medium further includes: a fifth instruction, used to prefetch the attributes and node structure information associated with the second hub node into a prefetch buffer of the first device when the first hub node is sampled, a gap between the first hub node and a root node of the first subgraph is a single hop, and a gap between the first hub node and the second hub node is a single hop.

In some embodiments, the non-transitory computer-readable storage medium further includes: a sixth instruction, used to acquire node identifiers of a plurality of nodes adjacent to a root node that is adjacent to the first hub node; a seventh instruction, used to sample at least one subset of the nodes corresponding to these node identifiers; and an eighth instruction, used to prefetch attributes of the nodes in the subset into a prefetch buffer of the first device.

In some embodiments, the non-transitory computer-readable storage medium further includes: a ninth instruction, used to prefetch attributes and node structure information associated with one of the plurality of nodes into a buffer of a third device, where the third device is coupled to the first device and the second device.

In some embodiments, the non-transitory computer-readable storage medium further includes: a tenth instruction, used to use the third device to monitor traffic, and prefetch attributes and node structure information associated with the node into the buffer of the third device when a measured value of the traffic meets a threshold.

Therefore, according to the embodiments of the present disclosure, latency associated with an operation of transmitting information between a plurality of interconnected (or coupled) devices is eliminated, thereby reducing an overall communication cost of the computing system. In addition to communication cost reduction, resources of the computing system are utilized more efficiently.

Those of ordinary skill in the art will appreciate the foregoing objective, other objectives, and advantages provided by various embodiments of the present disclosure after reading the following detailed description of the embodiments shown in the drawings.

BRIEF DESCRIPTION OF THE DRAWINGS

The accompanying drawings are incorporated in this specification and form a part of this specification, where the same/similar reference numerals depict same/similar elements. The accompanying drawings illustrate some embodiments of the present disclosure, and together with the detailed description, serve to explain principles of the present disclosure.

DETAILED DESCRIPTION

Figure 1:
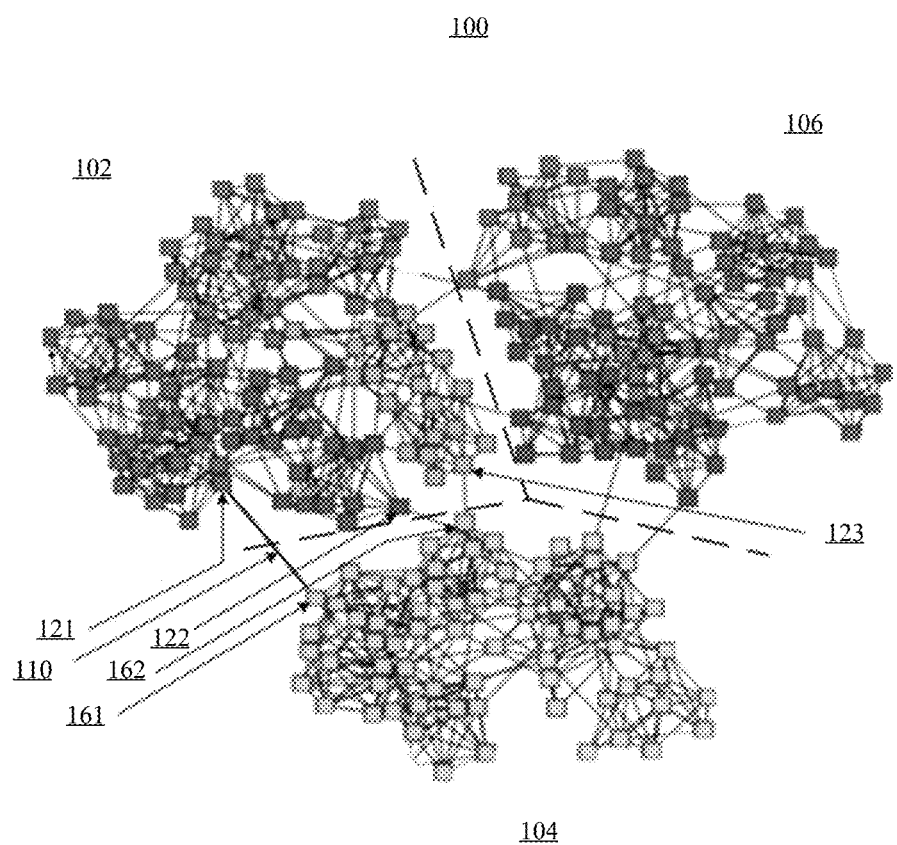
FIG. 1 illustrates a schematic diagram of an example distributed graph architecture of graphs that are stored on and executed by a computing system according to some embodiments of the present disclosure.

Reference will now be made in detail to various embodiments of the present disclosure, examples of which are illustrated in the accompanying drawings. While the disclosure is described in conjunction with these embodiments, it should be understood that it is not intended to limit the present disclosure to these embodiments. On the contrary, the present disclosure is intended to cover alternatives, modifications and equivalents as may be included within the spirit and scope of the present disclosure as defined by the appended claims. In addition, in the following detailed description, numerous specific details are set forth in order to provide a thorough understanding of the present disclosure. However, it should be understood that the present disclosure may be practiced without these specific details. In other instances, well-known methods, procedures, components and circuits have not been described in detail so as not to obscure the present disclosure.

Some portions of the detailed descriptions which follow are presented in terms of procedures, logic blocks, processing and other symbolic representations of operations on data bits within computer memory. These descriptions and representations are the means used by those skilled in the data processing arts to most effectively convey the substance of their work to others skilled in the art. In this application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computing system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless otherwise specifically stated as apparent from the following discussions, it is appreciated that throughout the present disclosure, discussions utilizing terms such as "accessing", "prefetching", "sampling", "sending", "writing", "reading", "dividing", "requesting", "storing", "recording", "transferring", "selecting", refer to actions and processes (for example, the method shown in FIG. 6) of a device or computing system or similar electronic computing device or system (for example, the systems shown in FIG. 2A, FIG. 2B, FIG. 3, and FIG. 5). A computing system or similar electronic computing device manipulates and transforms data represented as physical (electronic) quantities within memories, registers or other such information storage, transmission or display devices.

Some elements or embodiments described herein may be discussed in a general context of computer-executable instructions residing on a specific form of computer-readable storage medium (for example, program modules) executed by one or more computers or other devices. By way of example and not limitation, computer-readable storage media may include non-transitory computer storage media and communication media. Generally, program modules include routines, programs, objects, components, data structures, and the like, for performing particular tasks or implementing particular abstract data types. The functionality of the program modules may be combined or distributed as desired in various embodiments.

Computer storage media include volatile and nonvolatile, removable and non-removable media implemented in any method or technology for storage of information (for example, computer readable instructions, data structures, program modules, or other data). Computer storage media include, but are not limited to, a double data rate (Double Data Rate, DDR for short) memory, a random access memory (Random Access Memory, RAM for short), a static random access memory (Static Random Access Memory, SRAM for short), or a dynamic random access memory (Dynamic Random Access Memory, DRAM for short), a read only memory (Read Only Memory, ROM for short), an electrically erasable programmable read only memory (Electrically Erasable Programmable Read Only Memory, EEPROM for short), a flash memory (Flash Memory, such as Solid State Drive (SSD for short)) or other memory technologies, a compact disk read only memory (Compact Disk Read Only Memory, CD-ROM for short), a digital versatile disk (Digital Versatile Disk, DVD for short) or other optical storage, a magnetic cassette (Magnetic Cassette), a magnetic tape (Magnetic Tape), a magnetic disk storage (Magnetic Disk Storage) or other magnetic storage devices, or any other medium which can be used to store the desired information and which can be accessed to retrieve the information.

Communication media may embody computer executable instructions, data structures, and program modules, and include any information delivery media. By way of example and not limitation, communication media include wired media such as a wired network or direct-wired connection, and wireless media such as acoustic, radio frequency (Radio Frequency, RF), infrared, and other wireless media. Combinations of any of the above may also be included within the scope of computer readable media.

FIG. 1 illustrates a schematic diagram of an example distributed graph architecture of graphs that are stored on and executed by a computing system (for example, computing systems shown in FIG. 2A, FIG. 2B, FIG. 3, and FIG. 5) according to some embodiments of the present disclosure. In the example shown in FIG. 1, a graph 100 is logically divided into three communities (community) or subgraphs 102, 104, and 106. However, the number of subgraphs is not limited thereto. The graph 100 includes a plurality of nodes (each node is represented as a square in FIG. 1).

Typically, a community is a subset of nodes in a graph, so that the number of edges within the community is greater than the number of edges linking the community to the rest of the graph. The graph 100 may be logically divided into communities or subgraphs by using community detection algorithms such as, but not limited to: Kernighan-Lin (Kernighan-Lin, K-L for short) algorithm; Girvan-Newman (Girvan-Newman) algorithm; multi-level (multi-level) algorithm; leading eigenvector (leading eigenvector) algorithm; and Louvain (Louvain) algorithm.

Each node in the graph 100 represents an object, and attributes and structure information of the object is associated with a node representing the object. Attributes of a node/object may include one or more features or properties of the object (for example, if the object represents a person, the features may include the person's age and/or gender), and attribute data may include values of the one or more features (for example, a numeric value to characterize the person's age and a flag to identify the person's gender). Structure information of a node/object may include, for example, information for identifying a node (for example, a node identifier) and information for identifying other nodes connected to the node.

Through one or more hub nodes, each subgraph is connected to adjacent subgraphs through corresponding edges. For example, in FIG. 1, a subgraph 102 includes hub nodes 121, 122, and 123, which are connected to hub nodes 161 and 162 of a subgraph 104 through corresponding edges. The hub nodes in the subgraph 102 are similarly connected to hub nodes in a subgraph 106 and vice versa, hub nodes in the subgraph 104 are similarly connected to the hub nodes in the subgraph 106.

Neighboring or adjacent subgraphs (for example, the subgraphs 102 and 104) are connected to each other through a single hop (single hop), for example, an edge 110 connects a hub node 121 to a hub node 161. Nodes of subgraphs in the graph 100 are also connected to each other through edges.

Figure 2A:
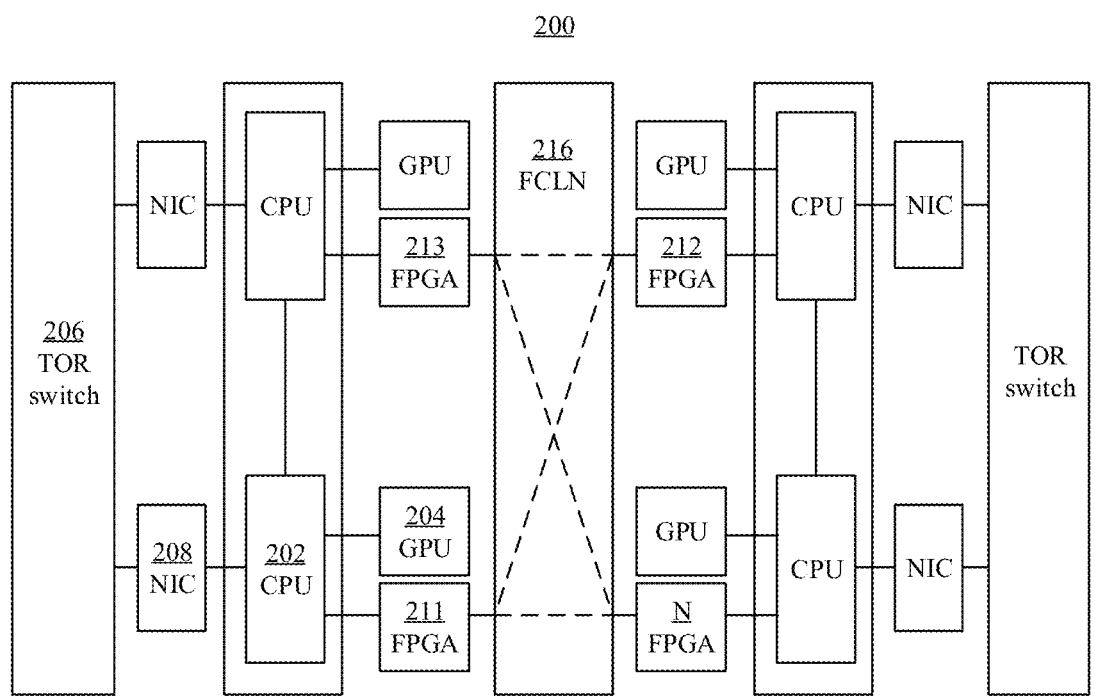
FIG. 2A illustrates a schematic block diagram of components in an example computing system according to some embodiments of the present disclosure.

FIG. 2A illustrates a block diagram of components in an example computing system 200 according to some embodiments of the present disclosure. The computing system 200 may be configured to store and execute a distributed graph architecture of the graph 100 in the example shown in FIG. 1.

In the example shown in FIG. 2A, the computing system 200 includes a plurality of central processing units (Central Processing Units, CPU for short), for example, including a CPU 202. In an embodiment of the present disclosure, each CPU includes or is coupled to a corresponding graphics processing unit (Graphics Processing Unit, GPU for short), such as a GPU 204. In some embodiments, each CPU is connected (or coupled) to a corresponding top-of-rack (Top-Of-Rack, TOR for short) switch (such as a TOR switch 206) via a network interface card (Network Interface Card, NIC for short) (such as a NIC 208).

In this embodiment of the present disclosure, each CPU is also connected (or coupled) to a corresponding device or integrated circuit, for example, connected (or coupled) to devices 211, 212, 213 . . . N (that is, devices 211-N). In the embodiment shown in FIG. 2A, each of the devices 211-N is a field programmable gate array (Field Programmable Gate Array, FPGA for short).

In this embodiment of the present disclosure, the devices 211-N are interconnected (or coupled) in a particular manner, so that among these devices, any device can communicate with any other device, transmit data to any other device, and receive data from any other device. In some embodiments, the devices 211-N are interconnected (or coupled) through a fully connected local area network (Fully Connected Local Network, FCLN for short) 216. In the following description (shown in conjunction with FIG. 3), in some embodiments, each of the devices 211-N is connected (or coupled) to an interface device 316, and the interface device 316 is, for example, a memory-over-fabric (Memory-Over-Fabric, MoF for short).

Figure 2B:
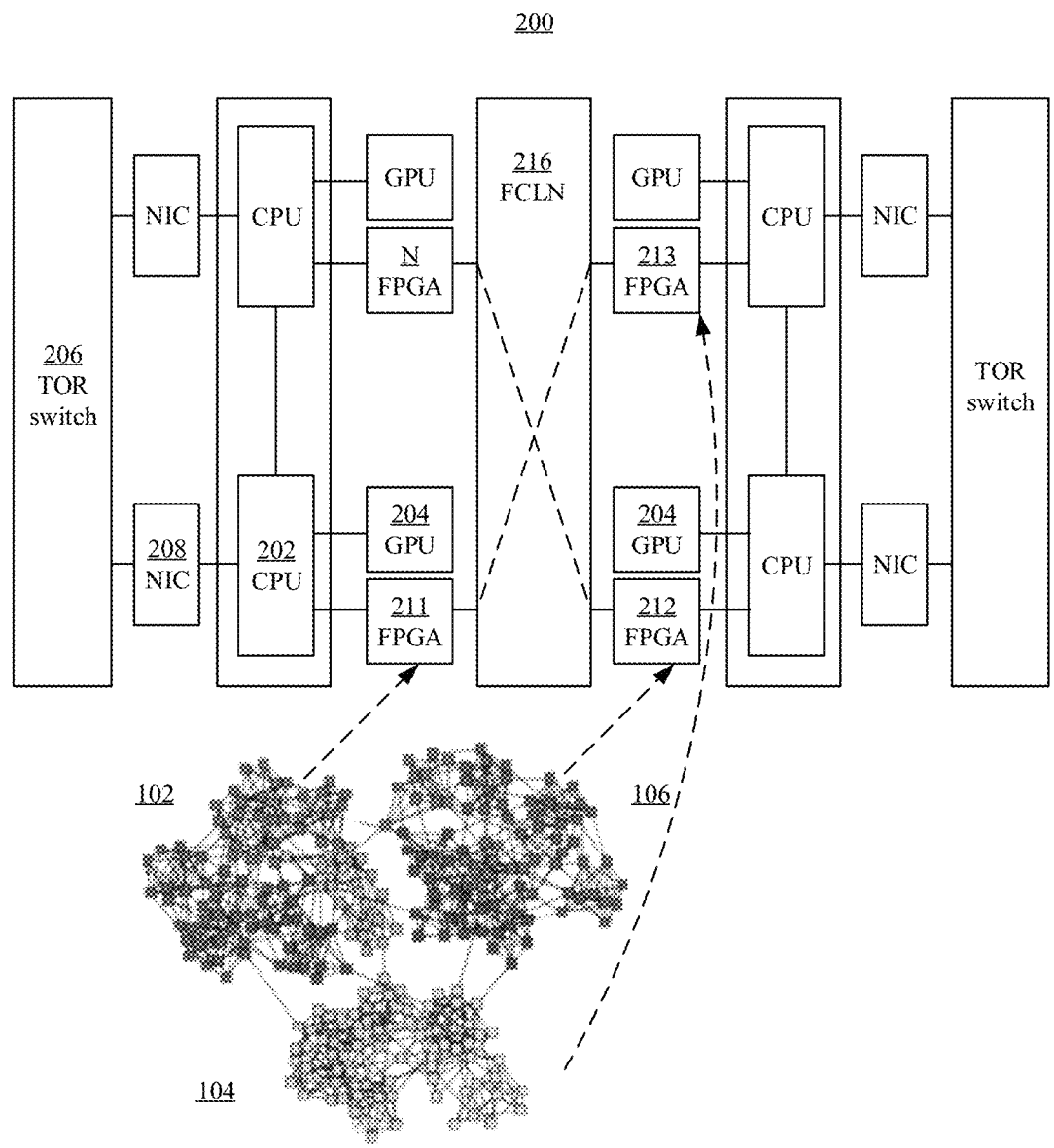
FIG. 2B illustrates a schematic diagram of a mapping relationship between subgraphs of an example distributed graph and devices in a computing system according to some embodiments of the present disclosure.

FIG. 2B illustrates a schematic diagram of a mapping relationship between the example subgraphs 102, 104, and 106 to the devices 211-N according to some embodiments of the present disclosure. In these embodiments, each of the devices 211-N stores and computes its own subgraph. In an example, the subgraph 102 is stored and computed by the device 211, the subgraph 106 is stored and computed by the device 212, and the subgraph 104 is stored and computed by the device 213.

Figure 3:
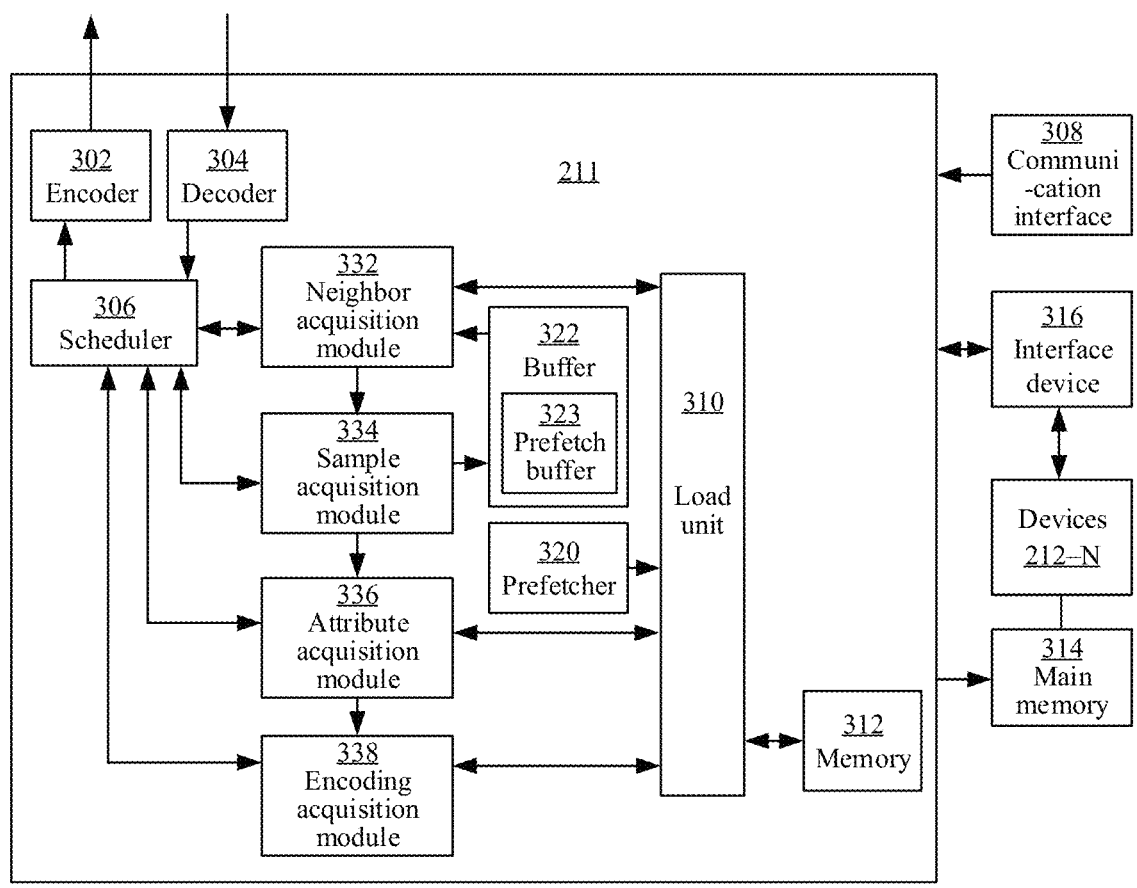
FIG. 3 illustrates a schematic block diagram of selected elements or selected components of a device for storing and computing subgraphs according to some embodiments of the present disclosure.

FIG. 3 illustrates a schematic block diagram of selected elements or selected components of a device (for example, a device 211) for storing and computing subgraphs according to some embodiments of the present disclosure. As described herein, the device 211 also helps to prefetch node attributes and node structure information (for example, node identifiers). Configurations and functions of each of other devices 212, 213 . . . N (that is, the devices 212-N) shown in FIGS. 2A and 2B are similar to those of the device 211. The devices 211-N may include elements or components other than those shown and described herein, and the elements or components may be coupled in a way shown in the figure or in other ways.

In an example, the device 211 is described in terms of the functions performed by some modules in the device 211. Although the modules are described and illustrated as separate modules, the present disclosure is not limited thereto. In other words, for example, combinations of these modules/functions can be integrated into a single module that performs a plurality of functions.

In the embodiment of FIG. 3, the example device 211 includes a command encoder 302 and a command decoder 304 that are coupled to a command scheduler 306. The device 211 includes or is coupled to a communication (communications) interface 308 (for example, an advanced extensible interface, Advanced Extensible Interface) to communicate with other devices (for example, a CPU 202) of the system 200 shown in FIG. 2A.

The device 211 is also coupled to a storage unit via a load unit (load unit, LD unit for short) 310. As described above, the device 211 may store and compute the subgraph 102. The storage unit includes a memory 312 on the device 211 (for example, a DDR memory) for storing attributes, node identifiers, and other node structure information of nodes in the subgraph 102. The storage unit further includes a main memory 314 (for example, a RAM), and the main memory 314 is coupled to the device 211 and the other devices 212-N.

The device 211 is also coupled to the other devices 212-N via an interface device 316 (for example, an MoF) to access subgraphs on the other devices. The following further describes the interface device 316 with reference to FIG. 5.

It should be noted that the device 211 shown in FIG. 3 includes a prefetcher 320, one or more buffers 322 with a prefetch buffer 323, a neighbor acquisition module 332, a sample acquisition module 334, an attribute acquisition module 336, and an encoding acquisition module 338. The prefetch buffer 323 is configured to store prefetched node attributes.

In the exemplary device 211, the prefetcher 320, the prefetch buffer 323, the neighbor acquisition module 332, the sample acquisition module 334, the attribute acquisition module 336, and the encoding acquisition module 338 constitute elements of an access engine (Access Engine, AxE for short) implemented on the device 211. The access engine may be implemented in hardware or software, or a combination of hardware and software.

In an embodiment of the present disclosure, because the number of hub nodes is relatively small, the attributes and node structure information (for example, node identifiers) of all hub nodes in all subgraphs of the graph 100 (see FIG. 1) can be stored by each of the devices 211-N in the system 200 (see FIG. 2A).

In the subgraphs of the graph 100 (see FIG. 1), a node of interest can be referred to as a root node in this specification. For example, a node can be selected and attributes of that node (root node) can be read or acquired.

However, in some cases, not all attributes of the root node may be known. For example, if an object represented by the root node is a person, the person's age may be recorded, but the person's gender may not be recorded. However, by using a community detection algorithm (used to organize and divide the nodes in the graph 100 into a plurality of communities or a plurality of subgraphs), an unknown attribute of the root node is deduced or estimated from attributes of adjacent nodes (the adjacent nodes described herein are nodes connected to the root node by a single hop). Optionally, the unknown attribute of the root node can be deduced or estimated based on attributes of nearby nodes (the nearby nodes described herein are nodes connected to the root node by a plurality of hops).

Referring to FIG. 3, the neighbor acquisition module 332 is configured to determine and extract from the memory 312 the node identifiers of the nodes adjacent to or near the root node. The node identifiers constitute a relatively small amount of data, and therefore, obtaining those node identifiers consumes only a relatively small amount of system resources (for example, bandwidth).

The sample acquisition module 334 then samples the nodes with the node identifiers identified by the neighbor acquisition module 332. The samples obtained from sampling may include all nodes identified by the neighbor acquisition module 332, or only include a subset of these nodes. For example, a subset of the nodes may be selected randomly or based on weights assigned to the nodes. The weight of a node may be determined, for example, based on a distance of the node from the root node, and the distance is measured by the number of hops between the node and the root node.

Afterwards, the attribute acquisition module 336 acquires from the memory 312 the attributes of the nodes sampled by the sample acquisition module 334. As described above, if the samples obtained through sampling by the sample acquisition module 334 include only a selected subset of nodes, the amount of data (attributes) obtained is reduced, thereby consuming fewer system resources.

Next, the encoding acquisition module 338 encodes the acquired attributes and writes them into a main memory (for example, a RAM 314), where the attributes can be accessed for other processing when necessary.

In an embodiment of the present disclosure, when a root node in a subgraph stored in the device 211 (see FIG. 3) is selected, and the root node is separated from hub nodes of the subgraph by a single hop (single hop), the device 211 may prefetch the attributes from the memory 312 into the buffer 322. In this case, hub nodes of adjacent subgraphs stored on a device (for example, the device 212) adjacent to the device 211 are separated from the root node by two hops (two hops). In this case, waiting time can be reduced by prefetching the attributes of the hub nodes of the subgraphs on the device 211 into the prefetch buffer 323, and prefetching the attributes of the hub nodes of adjacent subgraphs (for example, stored on the device 212) into the prefetch buffer 323. Then, if one of the above hub nodes is sampled, its attributes can be acquired directly from the prefetch buffer 323.

In addition, if one of the above hub nodes is sampled, the device 211 may send a request to another device (for example, the device 212) through the interface device 316, to prefetch attributes of nodes adjacent to the hub nodes on the another device.

Figure 4:
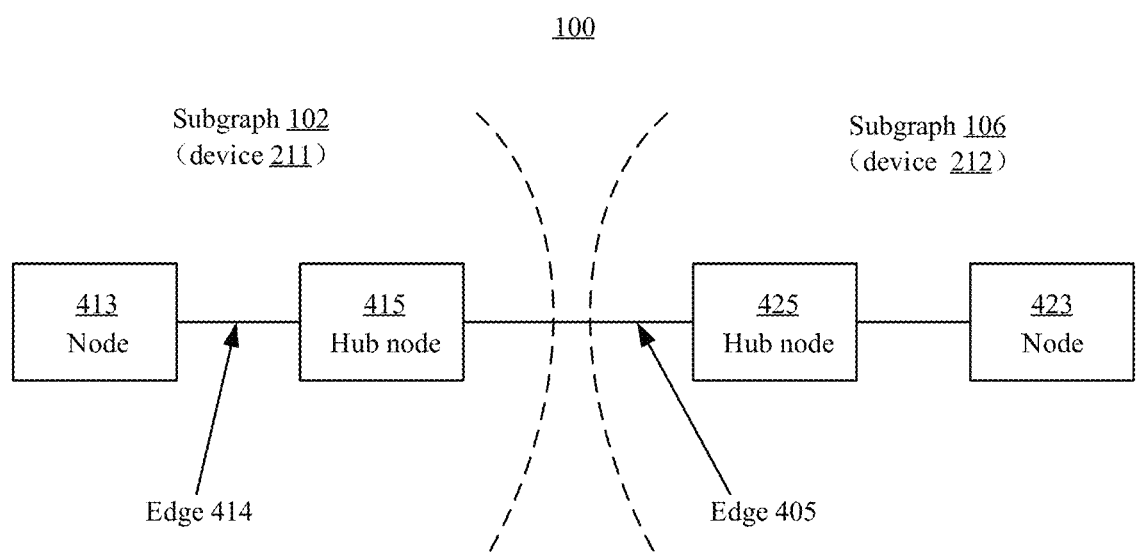
FIG. 4 illustrates a schematic diagram of elements of two adjacent subgraphs in a distributed graph according to some embodiments of the present disclosure.

FIG. 4 illustrates a schematic diagram of elements in two adjacent subgraphs 102 and 106 in the graph 100 according to some embodiments of the present disclosure. In this example, a hub node 415 of the subgraph 102 and a hub node 425 of the subgraph 106 are connected by a single hop through an edge 405, which means that the hub node 415 of the subgraph 102 and the hub node 425 of the subgraph 106 are first-hop neighbor nodes to each other. The subgraph 102 includes a node 413 adjacent to the hub node 415, which means that the node 413 and the hub node 415 are connected by a single hop through an edge 414. In this example, the node 413 and the hub node 425 are connected by two hops through the edge 414 and the edge 405. Similarly, the subgraph 106 includes a node 423 adjacent to the hub node 425. In this example, the node 413 is not a hub node, and may be referred to as an internal node or a non-hub node in the present disclosure. The subgraph 102 is stored and computed by the device 211 (which may be referred to as a first device herein), and the subgraph 106 is stored and computed by the device 212 (which may be referred to as a second device herein).

In some embodiments, when the node 413 is selected as the root node, the attributes of the hub node 415 may be prefetched into the prefetch buffer 323 of the first device 211. Similarly, when the node 423 is selected as the root node, the attributes of the hub node 415 may be prefetched into the prefetch buffer of the second device 212. In addition, when the node 413 is selected as the root node, the attributes of the hub node 425 may be prefetched into the prefetch buffer 323 of the first device 211. Similarly, when the node 423 is selected as the root node, the attributes of the hub node 425 may be prefetched into the prefetch buffer of the second device 212.

Through the prefetching operations as described above, waiting time associated with transferring information between the interconnected (or coupled) devices can be reduced or eliminated in many cases, thereby reducing an overall communication cost of the computing system.

Figure 5:
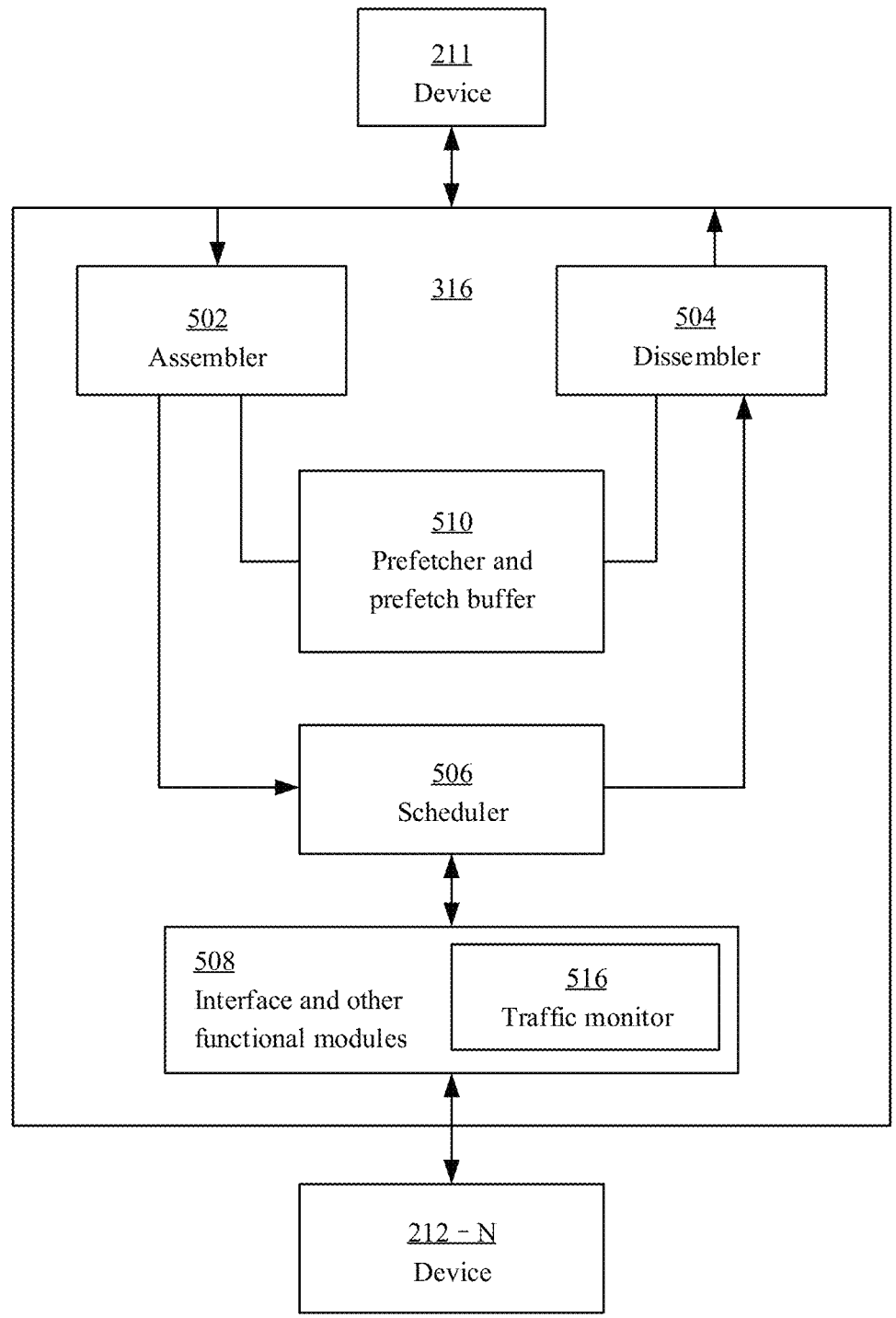
FIG. 5 illustrates a schematic block diagram of an interface device connected (or coupled) to a device for storing and computing subgraphs according to some embodiments of the present disclosure.

FIG. 5 illustrates a schematic block diagram of an interface device 316 (for example, an MoF) according to some embodiments of the present disclosure. In addition to the elements or components shown and described below, the device 316 may include other elements or components. The device 316 may be coupled to the devices 211-N in the computing system 200 shown in FIG. 2A, and may be referred to as a third device in the present disclosure.

The device 316 is coupled to the device 211, and optionally, to an access engine (AxE) on the device 211. In the example shown in FIG. 5, the device 316 includes: an assembler (assembler) 502, configured to assemble and route data packets for data transfers between the devices in the computing system 200; a dissembler (dissembler) 504, configured to disassemble the data packets and arbitrate the data transfers; and a scheduler 506. The device 316 further includes an interface and other functional modules 508 to perform other functions, such as flow control and error detection, and interfaces with the devices 212-N.

In some embodiments, the device 316 further includes a prefetcher and a prefetch buffer 510. The prefetcher may prefetch attributes and node structure information (for example, node identifiers) of nodes adjacent to hub nodes and store these attributes in the prefetch buffer 510. In the above example (for example, the example shown in FIG. 4), when the hub node 425 on the second device 212 is sampled by the first device 211, the nodes (for example, the node 423) adjacent to the hub node may also be sampled by the first device 211. In this case, in some embodiments, in response to sampling the hub node 425 on the second device 212, attributes of one or more nodes adjacent to the hub node are prefetched into the prefetch buffer 510 on the device 316, and then the device 211 can access and read the prefetch buffer 510 to acquire the attributes of the one or more nodes.

More specifically, in conjunction with FIG. 3 and FIG. 4, in some embodiments, for example, when the hub node 415 or the hub node 425 is sampled by the device 211, the neighbor acquisition module 332 of the device 211 sends a request to the device 316 for acquiring node identifiers, which are recorded on the second device 212, of nodes (for example, the node 423) adjacent or near to the hub node 425. In response to a request from the sample acquisition module 334, nodes (with node identifiers identified by the neighbor acquisition module 332 of the device 211, for example, the node 423) are sampled and attributes of these nodes are stored in the prefetch buffer 510 on the device 316. If a node is sampled, attributes of the node stored in the prefetch buffer 510 are sent by the device 316 to the first device 211. To be specific, in some embodiments, the operation of prefetching the attributes of the node is performed in response to a request from the attribute acquisition module 336 of the device 211.

Further, other more aggressive prefetching schemes can be used, where attributes can be prefetched from nodes that are more than a single hop or two hops away from the root node.

The prefetching through the device 316 further reduces waiting time associated with the information transfer between the interconnected (or coupled) devices, thereby further reducing the overall communication cost of the computing system.

In some embodiments, the device 316 further includes a traffic monitor 516. For example, the traffic monitor 516 monitors traffic (for example, bandwidth consumed) in the device 316. For example, when the traffic is low (for example, below a threshold), node attributes are prefetched into the prefetch buffer 510 on the device 316. Therefore, in addition to communication overheads reduction, resources of the computing system are utilized more efficiently.

The embodiments of the present disclosure significantly reduce a worst-case/long-tail delay. Compared with a reference scheme in which the hub nodes are not stored on the devices 211-N, simulation results of the embodiments of the present disclosure show that: as described above, the delay can be reduced by 47.6% by storing the hub nodes of all the devices 211-N in each device; in further combination of the improvement with the prefetch buffers and prefetch schemes on the devices 211-N, the delay can be reduced by 49.5%; and in combination of the foregoing improvement with the prefetch buffer and prefetch scheme on the device 316, the delay can be reduced by 74.8%.

Figure 6:
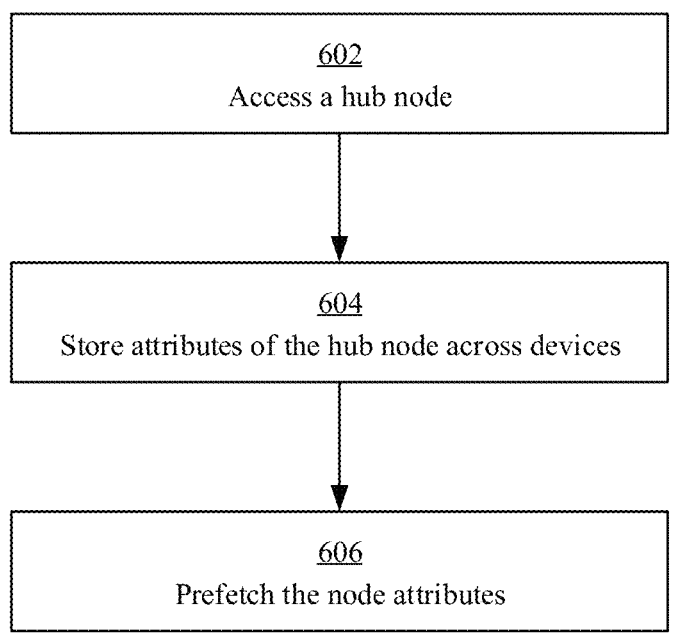
FIG. 6 illustrates a schematic flowchart of a computer-implemented method according to some embodiments of the present disclosure.

FIG. 6 illustrates a schematic flowchart 600 of a computer-implemented method according to some embodiments of the present disclosure. All or some of the operations represented by the blocks in flowchart diagram 600 can be implemented as computer-executable instructions residing on a specific form of non-transitory computer-readable storage medium, and may be executed by a computing system such as the computing system 200 shown in FIG. 2A. In one example discussed below, a graph is logically divided into: a first subgraph stored and computed by a first device, and a second subgraph stored and computed by a second device. This scheme can be easily extended to more than two subgraphs and devices.

In block 602 shown in FIG. 6, with reference to FIG. 4, the hub nodes 415 and 425 in the graph 100 are accessed. The graph is logically divided into a plurality of subgraphs including a plurality of hub nodes, and the plurality of hub nodes are used to connect the subgraphs, as described above.

In block 604, attributes and node structure information (for example, node identifiers) associated with the hub nodes (for example, the node 415) of the first subgraph 102 are stored in the second device 212. The second device 212 is further configured to store information of the second subgraph 106, and store attributes and node structure information (for example, node identifiers) associated with the hub nodes (for example, the node 425) of the second subgraph into the first device 211, where the first device 211 is further configured to store information of the first subgraph. The attributes include one or more node features or properties and their respective values, and as discussed above, the node structure information includes node identifiers and other structure information.

In block 606, node attributes are prefetched. Examples of the prefetch schemes are described above and below. However, the embodiments of the present disclosure are not limited to those examples.

In some embodiments, with reference to FIG. 3, node identifiers of the nodes adjacent to the root node (the root node being a root node adjacent to the hub node, for example, the node 413 adjacent to the hub node 415) are determined or acquired, at least one subset of these nodes is sampled, and attributes of the nodes in the sampled subset are prefetched into the prefetch buffer 323 of the first device 211.

In some embodiments, when a gap between a hub node of the first subgraph and the root node (for example, the node 413) of the first subgraph is a single hop (for example, through the edge 414), the attributes associated with the hub node (for example, the node 415) of the first subgraph 102 are prefetched into the prefetch buffer 323 of the first device 211.

In some embodiments, when a hub node (for example, the node 415) of the first subgraph 102 is sampled, a gap between the hub node of the first subgraph 102 and a root node (for example, the node 413) of the first subgraph is a single hop, and a gap between the hub node of the first subgraph and the hub node of the second subgraph is a single hop (for example, through the edge 405), the attributes associated with the hub node (for example, the node 425) of the second subgraph 106 are prefetched into in the prefetch buffer 323 of the first device 211.

In some embodiments, with reference to FIG. 5, attributes and node structure information (for example, node IDs) associated with nodes (for example, internal nodes or non-hub nodes) are prefetched into the prefetch buffer 510 of the third device 316 (for example, an MoF), where the third device 316 communicates (is coupled) with the first device 211 and the second device 212. More specifically, in these embodiments, in response to a request from the first device, node identifiers, which are on the second device, of nodes adjacent to the second hub node 425 are determined or acquired; at least one subset of these nodes is sampled; and the attributes of the sampled nodes are prefetched into the buffer 510 of the third device 316. In some embodiments, the device 316 is further configured to monitor traffic. In this case, if a measured value of traffic meets a threshold, the device 316 performs the prefetching.

Please note that the meaning of the word "coupled" within various embodiments of the present disclosure indicates that elements can be directly connected or those elements can be indirectly coupled together by one or more intervening elements.

While the foregoing disclosure has set forth various embodiments using specific block diagrams, flowcharts, and examples, each block diagram component, flowchart step, operation, and/or component described and/or illustrated herein may be individually configured using a wide range of configurations implemented individually and/or collectively. In addition, any disclosure of components contained within other components should be considered as an example because many other architectures can be used to implement the same functionality.

Although the subject matter has been described in a language specific to structural features and/or methodological acts, it should be understood that the subject matter defined in the present disclosure is not necessarily limited to the specific features or acts described herein. Rather, the specific features and acts described herein are disclosed as examples of implementing the present disclosure.

Embodiments of the present disclosure are thus described. While the present disclosure has included the description of specific embodiments, the present disclosure should not be construed as limited by these embodiments, but should be construed in accordance with the appended claims.

What is claimed is:

1. A computer-implemented method, comprising:
accessing a plurality of hub nodes in a graph, wherein the graph comprises a plurality of nodes and is logically divided into a plurality of subgraphs, the subgraph comprises at least one of the hub nodes, and each of the hub nodes in the subgraph separately connects the subgraph to another subgraph in the plurality of subgraphs;
storing attributes and node structure information associated with the hub nodes of a first subgraph in the plurality of subgraphs in a second device, wherein the second device is further configured to store information of a second subgraph in the plurality of subgraphs;
storing attributes and node structure information associated with the hub nodes of the second subgraph in a first device, wherein the first device is further configured to store information of the first subgraph; and
prefetching the attributes and node structure information associated with a hub node of the first subgraph into a prefetch buffer of the first device when a gap between the hub node of the first subgraph and a root node of the first subgraph is a single hop.

2. The method according to claim 1, further comprising: prefetching the attributes and node structure information associated with a hub node of the second subgraph into the prefetch buffer of the first device when a hub node of the first subgraph is sampled, a gap between the hub node of the first subgraph and a root node of the first subgraph is a single hop, and a gap between the hub node of the first subgraph and the hub node of the second subgraph is a single hop.

3. The method according to claim 1, within the attributes and node structure information associated with the hub nodes of the first subgraph and the attributes and node structure information associated with the hub nodes of the second subgraph comprise one or more of the following attributes and node structure information: a corresponding attribute value, a corresponding node identifier, and a corresponding node structure.

4. The method according to claim 1, further comprising: acquiring node identifiers of a plurality of nodes adjacent to a root node that is adjacent to a first hub node, sampling at least one subset of the nodes corresponding to these node identifiers, and prefetching attributes of the nodes in the sampled subset into the prefetch buffer of the first device.

5. The method according to claim 1, further comprising: prefetching attributes and node structure information associated with one of the plurality of nodes into a buffer of a third device, wherein the third device is coupled to the first device and the second device.

6. The method according to claim 5, further comprising: using the third device to monitor traffic, wherein when a measured value of the traffic meets a threshold, the prefetching is performed.

7. The method according to claim 5, wherein in response to a request from the first device, the prefetching includes: acquiring node identifiers of a plurality of nodes adjacent to a second hub node on the second device; sampling at least one subset of the nodes corresponding to the node identifiers; and extracting attributes of the nodes in the subset into the buffer of the third device.

8. The method according to claim 1, wherein the first device comprises a first field programmable logic gate array and the second device comprises a second field programmable logic gate array.

9. A system, comprising:
a processor;
a storage unit coupled to the processor; and
a plurality of coupled devices coupled to the storage unit, wherein the plurality of coupled devices comprise a first device and a second device, the first device comprises a memory and at least one buffer, and the second device comprises a memory and at least one buffer;
wherein the first device is configured to store information of nodes of a first subgraph of a graph, the second device is configured to store information of nodes of a second subgraph of the graph, and the graph comprises a plurality of subgraphs;
the nodes of the first subgraph comprise a first hub node, the nodes of the second subgraph comprise a second hub node, and the first hub node and the second hub node are connected to each other through an edge; and
the first device stores attributes and node structure information associated with the second hub node, and the second device stores attributes and node structure information associated with the first hub node;
wherein the first device comprises an access engine, and the access engine is configured to: prefetch node identifiers of a plurality of nodes adjacent to a root node that is adjacent to the first hub node, sample at least one subset of the nodes corresponding to the node identifiers, and acquire attributes of the nodes in the subset.

10. The system according to claim 9, wherein the attributes and node structure information associated with the first hub node and the attributes and node structure information associated with the second hub node comprise one or more of the following attributes and node structure information: a corresponding attribute value, a corresponding node identifier, and a corresponding node structure.

11. The system according to claim 9, wherein when a gap between the first hub node and a root node of the first subgraph is a single hop, the attributes and node structure information associated with the first hub node are prefetched into a prefetch buffer of the first device.

12. The system according to claim 9, wherein when the first hub node is separated from a root node and sampled, and a gap between the first hub node and the second hub node is a single hop, the attributes and node structure information associated with the second hub node are prefetched into a prefetch buffer of the first device.

13. The system according to claim 9, further comprising: a third device coupled to the first device and the second device, wherein the third device comprises a prefetch buffer, and the third device prefetches attributes and node structure information associated with one of the plurality of nodes into a prefetch buffer.

14. The system according to claim 13, wherein the third device further comprises a traffic monitor, and when traffic measured by the traffic monitor meets a threshold, the third device prefetches the attributes and node structure information associated with the node into the prefetch buffer.

15. The system according to claim 13, wherein the third device is configured to: in response to a request from the first device, acquire node identifiers of a plurality of nodes adjacent to the second hub node on the second device, sample at least one subset of the nodes corresponding to the node identifiers, and extract attributes of the nodes in the subset into the prefetch buffer of the third device.

16. The system according to claim 13, wherein the first device comprises a first field programmable logic gate array, the second device comprises a second field programmable logic gate array, and the third device comprises a memory-over-fabric coupled to the first device and the second device.

17. The system according to claim 9, wherein the first device comprises a first field programmable logic gate array and the second device comprises a second field programmable logic gate array.

18. A non-transitory computer-readable storage medium comprising computer-executable instructions stored thereon, wherein the computer-executable instructions comprise:
a first instruction, used to access a graph, wherein the graph comprises a plurality of subgraphs, the plurality of subgraphs comprise a first subgraph and a second subgraph, the first subgraph comprises a first node set having a first hub node, and the second subgraph comprises a second node set having a second hub node, and the first subgraph and the second subgraph are connected through an edge connecting the first hub node and the second hub node;
a second instruction, used to store attributes and node structure information associated with the second hub node in a first device, wherein the first device further stores information associated with the first subgraph;
a third instruction, used to store attributes and node structure information associated with the first hub node in a second device, wherein the second device further stores information associated with the second subgraph; and
a fourth instruction, used to prefetch the attributes and node structure information associated with the first hub node into a prefetch buffer of the first device when a gap between the first hub node and a root node of the first subgraph is a single hop.

19. The non-transitory computer-readable storage medium according to claim 18, further comprising: a fifth instruction, used to prefetch the attributes and node structure information associated with the second hub node into the prefetch buffer of the first device when the first hub node is sampled, a gap between the first hub node and a root node of the first subgraph is a single hop, and a gap between the first hub node and the second hub node is a single hop.

20. The non-transitory computer-readable storage medium according to claim 18, further comprising: a fifth instruction, used to acquire node identifiers of a plurality of nodes adjacent to a root node that is adjacent to the first hub node.

\* \* \* \* \*